United States Patent Office 3,511,804
Patented May 12, 1970

---

3,511,804
PROTECTION OF ORGANIC MATERIALS FROM ULTRAVIOLET RADIATION
Max Duennenberger, Frenkendorf, Christian Luethi, Munchenstein, and Hans Rudolf Biland, Basel, Switzerland, assignors to Ciba Limited, Basel, Switzerland, a company of Switzerland
No Drawing. Filed Jan. 25, 1967, Ser. No. 611,556
Claims priority, application Switzerland, Feb. 7, 1966, 1,681/66
Int. Cl. C08f 45/60; C08g 51/60
U.S. Cl. 260—45.85          7 Claims

ABSTRACT OF THE DISCLOSURE

Protection of organic materials, especially polycondensates, polyadducts and vinylpolymers, from the action of ultraviolet rays by applying to said materials oxalic acid ester amides of the formula

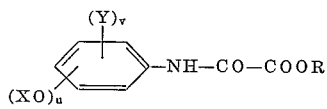

wherein X represents a possible substituted alkyl, alkenyl, aralkyl or acyl group, Y a possible substituted alkyl, halogen, phenyl, nitrile, nitro, substituted amino, aralkyl or a sulpho group, where two residues Y may represent the complement to an naphthalene ring, R stands for alkyl, alkoxy, benzyl, possible substituted phenyl, cyclohexyl group, $u$ and $v$ stand for 0, 1 or 2, the sum $(u+v)$ being 1 to 3.

---

The present invention relates to the protection of organic materials, that are damaged by the action of ultraviolet rays, from these rays with the aid of special oxalic acid ester amides.

According to this invention the protection from ultraviolet rays is achieved by means of oxalic acid ester amides of the formula (1)

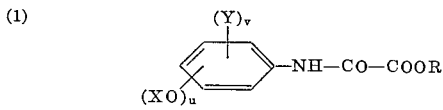

in which X represents an alkyl group containing 1 to 18 carbon atoms or an alkyl group containing substituents, preferably a carboxylic acid alkyl ester group, an alkenyl group, an aralkyl group or an aliphatic or aromatic acyl group; Y represents an alkyl group with 1 to 12 carbon atoms, or a halogen atom, a halogenalkyl, phenyl, nitrile, nitro or alkylamino group, a phenylalkyl group whose alkyl residue contains 1 to 4 carbon atoms, a sulphonic acid group or a sulphonamide group, or in which two ortho-positioned residues Y together represent a fused-on six-membered aromatic carbon ring, and R represents an alkyl group containing 1 to 18 carbon atoms, an alkoxyalkyl group containing 1 to 6 carbon atoms, the benzyl group, a phenyl group, a phenyl group substituted by hydroxyl groups or by alkyls containing 1 to 8 carbon atoms, a cyclohexyl group or a furylmethyl group, and $u$ and $v = 0$, 1 or 2, the sum $(u+v)$ being 1 to 3 and the value 0 indicating a hydrogen atom when used as an index number.

Among the above-mentioned compounds there are of special value those of the formula (2)

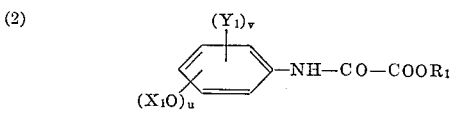

in which $X_1$ represents an alkyl group containing 1 to 18 carbon atoms, an alkenyl group or an aralkyl group; $Y_1$ represents an alkyl group with 1 to 12 carbon atoms, a halogen atom, a halogenalkyl or phenyl group, or a phenylalkyl group whose alkyl residue contains 1 to 4 carbon atoms, or where two ortho-positioned residues $Y_1$ together form a fused-on six-membered aromatic carbon ring, and $R_1$ stands for an alkyl group containing 1 to 18 carbon atoms, for the benzyl group or a phenyl group, and $u$ and $v=0$, 1 or 2, the sum $(u+v)$ being 1 or 2 and the value 0 indicating a hydrogen atom when used as an index number.

Of special value within this scope, above all for protecting polycondensates, polyadducts or polyvinylchloride from ultraviolet rays, are those oxalic acid ester amides which correspond to the formula (3)

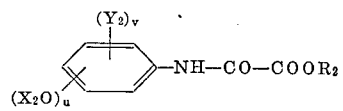

in which $X_2$ represents an alkyl group containing 1 to 18 carbon atoms which may be substituted by Cl, HO, alkoxy groups with 1 to 4 carbon atoms, by carboxyl, carboxylic acid alkyl ester or carboxylic acid amide groups containing 1 to 12 carbon atoms, or an alkenyl group containing 3 or 4 carbon atoms or a benzyl group which may be substituted by Cl or methyl groups; $Y_2$ represents a hydrogen atom, an alkyl group containing 1 to 12 carbon atoms, a halogen atom, a halogenomethyl group, a phenyl group or a phenylalkyl group; $R_2$ represents an alkyl group containing 1 to 8 carbon atoms and $u$ and $v=0$, 1 or 2 with the sum $(u+v)=1$ or 2.

According to preferred variants of the invention the process for protecting the above-mentioned materials from ultraviolet rays consists in the aid or use of specific types of oxalic acid ester amides of the following formulae:

(a) Compounds of the formula (4)

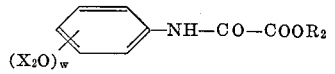

in which $X_2$ represents an alkyl group containing 1 to 18 carbon atoms which may be substituted by Cl, HO, alkoxy groups with 1 to 4 carbon atoms, carboxyl, carboxylic acid alkyl ester or carboxylic acid amide groups with 1 to 12 carbon atoms, or an alkenyl group containing 3 or 4 carbon atoms, or a benzyl group which may be substituted by Cl or methyl groups; $R_2$ represents an alkyl group with 1 to 8 carbon atoms, and $w=1$ or 2.

(b) Compounds of the formula (5)

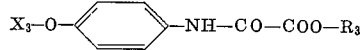

in which $X_3$ represents an alkyl group with 1 to 18 carbon atoms, a benzyl group, an aliphatic or aromatic acyl group containing up to 12 carbon atoms, an allyl group, a carbalkoxyalkyl group with up to 6 carbon atoms, and $R_3$ represents an alkyl group with up to 18 carbon atoms, a benzyl group, an alkoxyalkyl group with up to 4 carbon atoms, a cyclohexyl group or a phenyl group which may contain hydroxyl groups or alkyl groups containing up to 4 carbon atoms.

(c) Compounds of the formula (6)

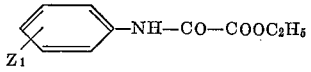

in which $Z_1$ represents an alkyl group with 1 to 6 carbon atoms, an alkoxy group with 1 to 8 carbon atoms, an alkylamino group whose alkyl residue may contain 1 to 4 carbon atoms, a chlorine or bromine atom, a trifluoromethyl group or a nitro group.

(d) Compounds of the formula (7) 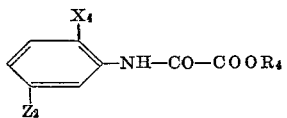

in which $X_4$ represents an alkoxy group with 1 to 4 carbon atoms; $Z_2$ represents an alkoxy group or alkyl group with 1 to 4 carbon atoms or a halogen atom, and $R_4$ the methyl or ethyl group.

(e) Compounds of the formula (8) 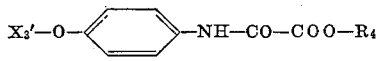

in which $X'_3$ represents an alkyl group with 1 to 4 carbon atoms, and $R_4$ the methyl or ethyl group, the latter being particularly suitable as an ultraviolet absorber for polyvinylchloride.

From the large number of suitable oxalic acid ester amides the following non-limiting examples may be mentioned:

(9) 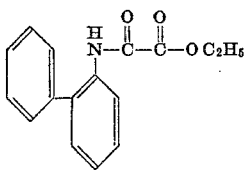

(10) 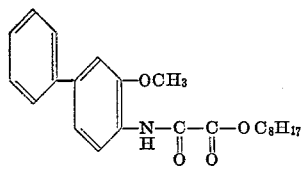

(11) 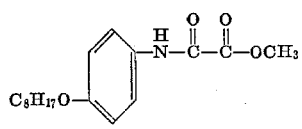

(12) 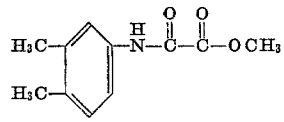

(13) 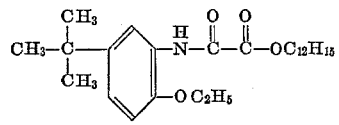

(14) 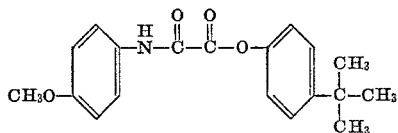

(15) 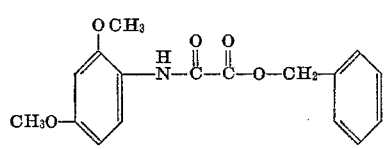

(16) 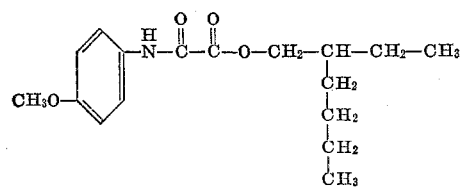

The oxalic acid ester amides to be used in the present invention may be prepared by the known methods of the amidation of oxalic acid or its esters by reacting oxalic acid, an oxalic acid semiester or diester, with identical or different ester residues, with the corresponding primary amines. According to a novel, particularly favourable method of manufacturing oxalic acid ester amides of the Formula 1 oxalic acid diesters of the Formula 17 ROOC—COOR are reacted with aromatic primary amines of the formula

(18) 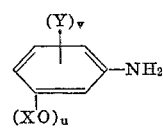

where X, Y, R, $u$ and $v$ have the same meanings as in Formula 1 in the melt or in an inert organic solvent in the presence of anhydrous boric acid. The amount of boric acid to be used in this reaction is 0.1 to 5% of the weight of the oxalic acid ester. The reaction temperature should in general be from 50 to 250° C., preferably from 100 to 150° C. Suitable inert solvents are those which are chemically inert towards the reactants under the indicated reaction conditions. Relevant examples are: Benzene, toluene, chlorobenzenes (especially those which boil above about 140° C., such as di- and trichlorobenzene), polyhydric alcohols such as diethyleneglycol diethyl ether, high-boiling hydrocarbons such as para-cymene and others.

When such a solvent is used, the eliminated alcohol should be removed during the condensation.

The condensation in the presence of boric acid is not only very economical but it makes it, above all, possible to shorten the reaction time considerably or, alternatively, to reduce the reaction temperature. This ensures a substantially better yield of known compounds and it is now also possible to obtain in a smooth reaction compounds that have not been accessible in the past because of their thermal instability.

Another possibility of varying the ester residue R in the oxalic acid ester amides described above is the transesterification—preferably of the methyl or ethyl ester—in the presence of a catalytic amount of an alkali metal or alkali metal alcoholate and in a solution in (an excess of) the alcohol required for the transesterification.

According to another possibility of varying the ester residue R the oxalic acid semiamide (prepared from oxalic acid and a primary amine, or by hydrolyzing the methyl or ethyl ester of the oxalic acid ester amide) is converted into the acid chloride (for example with thionylchloride or phosphorus pentachloride by a known method) which is then reacted upon the corresponding alcohol or the alkali metal salt of a phenol in an inert solvent at 0 to 100° C.

All compounds containing modified hydroxyl groups (for example alkoxy or alkenyloxy groups) are, of course, accessible by primary condensation of the aromatic amines containing free hydroxyl groups with oxalic acid esters, followed by modification of these hydroxyl groups by a known etherifying or esterifying method.

In principle, the above-mentioned oxalic acid amide esters may be used for protecting all those organic materials which are damaged or destroyed in any form by the action of ultraviolet rays, since the said oxalic acid derivatives are pronounced absorbers within the spectral region that is normally a damaging factor. Such damages by the action of the same cause, namely ultraviolet rays, may have widely varying results, for example a change in colour, a change in the mechanical properties (embrittlement, fissuring, tear strength, flexural strength, abrasion resistance, elasticity, ageing), triggering of undesired chemical reactions (decomposition of sensitive chemical substances, for example medicaments), photochemically induced rearrangements, oxidation and the like (for example of oils containing unsaturated fatty acids), causing of burns and irritations (for example on human skin) and the like.

Accordingly, the organic materials to be protected may belong to a wide variety of types and be present in very different processing stages and physical states, all having the common characteristic that they are sensitive towards ultraviolet rays.

Organic materials of this kind may have a high or a low molecular weight.

As low-molecular or higher-molecular substances that can be protected or stabilized by the present process, there may be mentioned the following non-limiting examples:

Organic natural materials as used for pharmaceutical purposes (medicaments), ultraviolet-sensitive dyestuffs, compounds that are decomposed as victuals or in victuals by exposure to light (unsaturated fatty acids in oils) and the like. However, particularly good results are obtained by using the said oxalic acid derivatives for the protection of polycondensates, polyadducts and polyvinylchloride as well as cosmetics.

As organic materials based on polymers, suitable for protection according to this invention, there may be mentioned, for example:

Polymers based on $\alpha,\beta$-unsaturated carboxylic acids, acrylates, acrylamides and acrylonitrile; polymers based on vinyl and vinylidene halides as well as vinyl esters; unsaturated aldehydes and ketones, alkyl compounds, other polymers, for example those accessible by ring opening, for instance polyamides of the polycaprolactam type; also formaldehyde polymers, or polymers accessible by polyaddition as well as by polycondensation, such as polyethers, polythioethers, polyacetals and thioplasts.

As examples of preferably protected polycondensates and polyadducts there may be mentioned:

(1) Polycondensates and precondensates based on bifunctional and polyfunctional compounds containing condensable groups, their homocondensates and cocondensates, as well as after-treating products, for example polyesters [saturated (for example polyethylene terephthalate) or unsaturated (for example maleic acid-dialcohol polycondensates and their cross-linked products with co-polymerizable vinylmonomers), linear and branched (also those based on polyhydric alcohols, for example alkyd resins)]; polyamides (for example hexamethylenediamine adipate); meleinate resins, melamine resins, phenol resins (for example Novolak), aniline resins, or their precondensates or similarly constituted products; polycarbonates, silicone resins and others.

(2) Polyadducts such as polyurethanes (crosslinked or not crosslinked), epoxy resins.

Further organic materials suitable for being protected according this invention are (a) Semisynthetic organic materials, for example cellulose esters or mixed esters (acetate, propionate, nitrocellulose, cellulose ethers, regenerated cellulose, viscose rayon, cuprammonium cellulose) or their after-treating products; casein synthetics.

(b) Natural organic materials of animal or vegetable origin, for example those based on cellulose or protein, such as wool, cotton, silk, bast, jute, hemp, furs and hairs, leathers, finely dispersed wood pulp, natural resins (such as colophony, especially lacquer resins), gelatin, glues, also rubber, gutta percha, balata and products obtained by after-treating or modifying them, decomposition products, products accessible by modifying reactive groups.

The organic materials concerned may be at widely differing stages of their processing (raw materials, semifinished products or finished products) and physical states. They may be in the form of products shaped in a wide variety of ways, that is to say, for example, as predominantly three-dimensional objects such as sections, vessels or components of a great variety, chips or granules, foamed products; predominantly two-dimentional materials such as films, foils, lacquers, impregnations or coatings, or predominantly unidimensional materials such as filaments, fibres, flocks, bristles or wires. The said materials may also be in unshaped states in a wide variety of homogeneous or inhomogeneous forms of distribution and physical states, for example in the form of powders, solutions, normal and reversed emulsions (creams), dispersions, latices, sols, gels, putties, waxes, adhesives or pore fillers, and the like.

Fibrous materials may be used in a wide variety of processing forms of non-textile materials, for example as threads, yarns, fibre fleeces, padding, felts, flocculated materials or as textile fabrics or textile laminates, knitwear, papers, carboards and the like.

The new ultraviolet stabilizers may also be used, for example, as follows:

(a) In cosmetics, such as perfumes, dyed or undyed soaps and bath salts, skin and face creams, powders, repellants and especially sunburn oils and creams;

(b) In admixture with dyestuffs or pigments or as additives to dyebaths, printing, discharge or reserve pastes, also for after-treating dyeings, prints or discharge prints;

(c) In admixture with so-called carriers, antioxidants, other light filters, heat stabilizers or chemical bleaches;

(d) In admixture with crosslinking agents or dressing agents such as starch or synthetically produced dressings;

(e) In combination with detergents (the detergents and stabilizers may, if desired, be added separately to the washing liquors);

(f) In gelatin layers used in photography;

(g) In combination with polymeric vehicles (products of polymerization, polycondensotion or polyaddition) in which the stabilizers, if desired in addition to other substances, are incorporated in the dissolved or dispersed form, for example in coating, impregnating or binding agents (solutions, dispersions, emulsions) for textiles, fleeces, papers, leathers;

(h) As additives to a wide variety of industrial products to reduce the speed of their ageing, for example as additives to glues, adhesives, paints or the like.

Furthermore, the new ultraviolet stabilizers to be used according to this invention are preferably added to or incorporated with the materials prior to or during their shaping. Thus, for example, they may be added to the moulding or injection moulding compositions used in the manufacture of films, foils, tapes or mouldings, or they may be dissolved or dispersed or in any other way finely distributed in the spinning mass before it is spun. The protective compounds may also be added to the starting substances, reaction mixtures or intermediates used in the manufacture of fully synthetic or semisynthetic organic materials, that is to say also before or during the chemical reaction, for example in a polycondensation (including precondensates), in a polymerization (including prepolymers) or in a polyaddition.

An important sphere of application of the stabilizers to be used in the invention consists in incorporating these substances in a protective layer used to protect material placed underneath it. This application may take the form of applying the ultraviolet absorber to the surface layer (of a film or of a fibre or of a multidimensional shaped object). This can be done for example similar to a dyeing process, or the active substance may be embedded in a polymer (polycondensate or polyadduct) film by one of the known surface coating methods with polymeric substances, or the active substance may be dissolved in a suitable solvent and caused to diffuse or swell into the surface layer. According to another important variant the ultraviolet absorber is embedded in a self-supporting, substantially two-dimensional carrier material, for example a foil or the wall of a vessel, in order to keep ultraviolet rays away from the substance located behind it (relevant examples: shop windows, films, transparent packages, bottles).

From the foregoing it is self-evident that in addition to the protection of the substrate or carrier material containing the ultraviolet absorber also other substances contained in the substrate are protected, for example dyestuffs, antioxidants, disinfectants, antistatics and other dressing agents, plasticizers and fillers.

Depending on the type of substance to be protected or stabilized, on its sensitivity or the form in which the protection and stabilization is to be imparted, the requisite amount of stabilizer may vary within wide limits, for example from about 0.01 to 10% by weight, referred to the amount of substrate to be protected. For most practical purposes, however, a quantity from about 0.02 to 2% will suffice.

Parts and percentages in the following manufacturing instructions and examples are throughout by weight, unless otherwise indicated. The melting points are uncorrected.

MANUFACTURING INSTRUCTIONS (Especially for the compounds in Table A)

(1) A mixture of 37 parts of para-anisidine, 50 parts of oxalic acid diethyl ester and 0.5 part of boric acid is stirred for 4 hours at 110 to 115° C., during which the alcohol formed is continuously distilled off. The melt is then dissolved in 250 parts of boiling alcohol, the insoluble diamide is filtered off and the filtrate mixed with 500 parts of water, whereupon the product of the formula

(19) 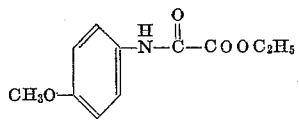

settles out in the form of almost colourless crystals. The analytically pure product obtained by two recrystallizations from aqueous alcohol melts at 107 to 108° C. and reveals the following data:

$C_{11}H_{13}O_4N$.—Calculated (percent): C, 59.18; H, 5.87; N, 6.28. Found (percent): C, 59.26; H, 6.00; N, 6.02.

(2) 20.9 parts of the compound of the formula

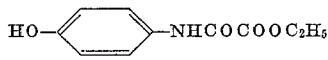

(prepared from para-aminophenol and oxalic acid diethyl ester in the presence of a catalytic amount of boric acid at 120 to 130° C.) are dissolved at 20° C. in 50 parts of dimethylsulphoxide, then 14 parts of potassium carbonate (anhydrous) and 18 parts of benzylbromide are added at 0° C. The batch is then stirred for 6 hours at 0° C., then for 2 hours at 10° C. and finally for 16 hours at room temperature. The product of the formula

(20) 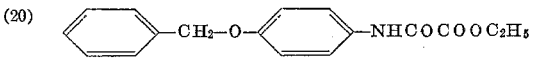

is then precipitated from the reaction solution with alcohol and water. Yield: 22 parts. To purify the crude product it is recrystallized from benzene (with addition of bleaching earth Tonsil NFF) and cyclohexane. After two recrystallizations and one chromatography on alumina (activity III) with benzene, the product melts at 107 to 108° C. and reveals the following data:

$C_{17}H_{17}O_4N$.—Calculated (percent): C, 68.21; H, 5.73; N, 4.68. Found (percent): C, 68.35, H, 5.52; N, 4.65.

(3) A mixture of 10.5 parts of the compound of the formula

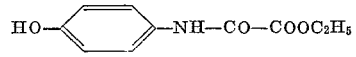

13.2 parts of laurylchloride and 30 parts of chlorobenzene is refluxed for 2 hours. The batch is decolorized with 1.5 parts of a kieselguhr preparation, filtered, and the filtrate is stirred into 50 parts of hot alcohol. The resulting crystallizate is suctioned off, washed with 20 parts of methanol and dried. Yield: 15.5 parts of the compound of the formula

(21) 

which melts at 106 to 107° C. and reveals the following analytical data:

$C_{22}H_{33}O_5N$.—Calculated (percent): C, 67.49; H, 8.50; N, 3.58. Found (percent): C, 67.43; H, 8.77; N, 3.56.

The compounds listed in the following Table A are obtained in an identical or similar manner. In this table Column I=formula N°
Column II=structural formula
Column III=melting point in °C (uncorrected)
Column IV=analytical data for C H N (1st line—calculated 2nd line—found)

TABLE A

| | | | IV | | | | | |
|---|---|---|---|---|---|---|---|---|
| | | | Calculated | | | Found | | |
| I | II | III | C | H | N | C | H | N |
| 22 | (structure with Cl, CF₃, NH—CO—CO—OC₂H₅) | 128–129 | 44.69 | 3.07 | 4.74 | 44.66 | 3.17 | 4.89 |
| 23 | (structure with O₂N, NH—CO—CO—OC₂H₅) | 171–172 | 50.42 | 4.23 | 11.76 | 50.72 | 4.47 | 11.83 |
| 24 | (structure with CH₃O, OCH₃, NH—CO—CO—OC₂H₅) | 144–145 | 56.91 | 5.97 | 5.53 | 57.02 | 5.87 | 5.38 |
| 25 | (structure with H₃C–N–CH₃, NH—CO—CO—OC₂H₅) | 118–119 | 61.00 | 6.83 | 11.86 | 61.30 | 6.61 | 12.01 |

TABLE A—Continued

| I | II | III | IV Calculated C | H | N | Found C | H | N |
|---|---|---|---|---|---|---|---|---|
| 26 | 4-Cl-C6H4-NH-CO-CO-OC2H5 | 152-153 | 52.76 | 4.43 | 6.15 | 52.63 | 4.30 | 6.40 |
| 27 | 4-Br-C6H4-NH-CO-CO-OC2H5 | 157-158 | 44.14 | 3.70 | 5.15 | 44.88 | 3.67 | 5.18 |
| 28 | 4-H3C-C6H4-NH-CO-CO-OC2H5 | 60-61 | 63.75 | 6.32 | 6.76 | 63.79 | 6.29 | 6.87 |
| 29 | 3,4-(H3C)2-C6H3-NH-CO-CO-OC2H5 | 70-71 | 65.14 | 6.83 | 6.33 | 65.42 | 6.86 | 6.31 |
| 30 | 2,6-(CH3)2-C6H3-NH-CO-CO-OC2H5 | 51-52 | 65.14 | 6.83 | 6.33 | 64.98 | 7.03 | 6.47 |
| 9 | 2-biphenylyl-NH-CO-CO-OC2H5 | 113-114 | 71.36 | 5.61 | 5.20 | 71.30 | 5.74 | 5.21 |
| 31 | H17C8-O-C6H4-NH-CO-COOC2H5 | 59-60.5 | 67.26 | 8.47 | 4.36 | 67.40 | 8.19 | 4.64 |
| 32 | CH3-CO-O-C6H4-NH-CO-COOC2H5 | 117-118 | 57.37 | 5.22 | 5.58 | 57.60 | 5.25 | 5.50 |
| 33 | C6H5-CO-O-C6H4-NH-CO-COOC2H5 | 162-163 | 65.17 | 4.82 | 4.47 | 65.12 | 4.77 | 4.46 |
| 34 | Cl-C6H4-COO-C6H4-NH-CO-COOC2H5 | 153-154 | 58.72 | 4.06 | 4.03 | 58.88 | 4.04 | 3.93 |
| 35 | (CH3)3C-C6H4-COO-C6H4-NH-CO-COOC2H5 | 158-160 | 68.28 | 6.28 | 3.79 | 68.37 | 6.49 | 3.90 |
| 36 | CH2=CHCH2O-C6H4-NH-CO-COOC2H5 | 92.5-93 | 62.64 | 6.07 | 5.62 | 62.66 | 5.91 | 5.52 |
| 37 | C18H37O-C6H4-NHCOCOOC2H5 | 87.5-88 | 72.84 | 10.26 | 3.03 | 72.59 | 10.01 | 2.77 |
| 38 | C2H5OOCCH2-O-C6H4-NHCOCOOC2H5 | 112-113 | 56.94 | 5.80 | 4.74 | 56.52 | 5.69 | 4.58 |
| 39 | C2H5O-C6H4-NHCOCOOC2H5 | 109.5-110.5 | 60.75 | 6.37 | 5.90 | 60.94 | 6.34 | 6.06 |
| 40 | 2-naphthyl-NHCOCOOC2H5 | 119.5-120 | 69.12 | 5.39 | 5.76 | 69.17 | 5.29 | 5.70 |
| 41 | 1-naphthyl-NHCOCOOC2H5 | 107-108 | 69.12 | 5.39 | 5.76 | 69.53 | 5.51 | 5.83 |

TABLE A—Continued

| I | II | III | IV Calculated C | H | N | Found C | H | N |
|---|---|---|---|---|---|---|---|---|
| 42 | 2-OCH₃, 5-OCH₃ C₆H₃-NHCOCOOC₂H₅ | 80–81.5 | 56.91 | 5.97 | 5.53 | 56.98 | 5.96 | 5.51 |
| 43 | 4-CH₃, 2-OCH₃ C₆H₃-NHCOCOOC₂H₅ | 73.5–74 | 60.75 | 6.37 | 5.90 | 60.79 | 6.24 | 5.91 |
| 44 | 4-CH₃, 5-Cl, 2-OCH₃ C₆H₂-NHCOCOOC₂H₅ | 102.5–103.5 | 53.64 | 5.19 | 5.16 | 53.38 | 5.25 | 5.08 |
| 45 | 4-CH₃, 2-OC₂H₅ C₆H₃-NHCOCOOC₂H₅ | 98–99 | 62.14 | 6.82 | 5.57 | 62.04 | 6.65 | 5.27 |
| 46 | 4-OCH₃, 2-Cl C₆H₃-NHCOCOOC₂H₅ | 79–79.5 | 51.27 | 4.69 | 5.44 | 51.20 | 4.66 | 5.51 |
| 47 | 4-OC₂H₅, 2-OC₂H₅ C₆H₃-NHCOCOOC₂H₅ | 86.5–87.5 | 59.77 | 6.81 | 4.98 | 59.82 | 6.89 | 4.92 |
| 48 | 4-N≡C C₆H₄-NHCOCOOC₂H₅ | 189–190 | 60.54 | 4.62 | 12.84 | 60.46 | 4.64 | 12.9 |
| 49 | 2-OCH₃ C₆H₄-NHCOCOOC₂H₅ | 86–87 | 59.18 | 5.87 | 6.28 | 59.24 | 5.93 | 6.26 |
| 50 | 4-NH₂O₂S, 2-OCH₃ C₆H₃-NHCOCOOC₂H₅ | 175–175.5 | 43.70 | 4.67 | 9.27 | 43.79 | 4.73 | 9.18 |
| 51 | 2-OC₂H₅ C₆H₄-NHCOCOOC₂H₅ | 80–81 | 60.75 | 6.37 | 5.90 | 60.68 | 6.27 | 6.05 |
| 52 | naphthyl-NH—CO—COOC₂H₅ | 130–131 | 71.36 | 5.61 | 5.20 | 71.35 | 5.44 | 5.22 |
| 52a | C₁₈H₃₇O—C₆H₄—NH—CO—COO—C₁₈H₃₇ | 98–99.5 | 77.02 | 11.61 | 2.04 | 77.97 | 11.77 | 2.12 |

Manufacturing example and Tables B

A mixture of 11.15 parts of the compound of the Formula 19 dissolved in 20 parts of alcohol, 22.3 parts of lauryl alcohol and 0.5 part of sodium metal is heated with stirring, and the alcohol present and the alcohol formed are continuously distilled off. The batch is then refluxed for 6 hours.

For working up the reaction mixture is mixed with 400 parts of chlorobenzene and the chlorobenzene solution is twice washed with water. The chlorobenzene is then distilled off, the residual oil taken up in 100 parts of acetone, and water is added until turbidity sets in. On cooling in an ice-bath the compound of the formula

(53) 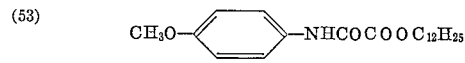 $CH_3O-\langle\phantom{XX}\rangle-NHCOCOOC_{12}H_{25}$ is obtained in crystalline form in a yield of 9.1 parts. The analytically pure product obtained by one recrystallization from aqueous acetone melts at 61 to 62° C. Analytical data: $C_{21}H_{33}O_4N$.—Calculated (percent): C, 66.42; H, 8.20; N, 4.56. Found (percent): C, 66.65; H, 8.13; N, 4.33.

In a completely analogous manner, or by the transesterification described below, the compounds listed in the following Tables B were prepared; they demonstrate the variability of the ester residue R. In this table Column I=formula No.
Column II, Table $B_1$=ester residue $R_3'$ according to Formula 54
Column II, Table $B_2$=structural formula
Column III=melting point ° C. (uncorrected)
Column IV=analytical data, 1st line=calculated, 2nd line=found.

pound in the substrate to be used should be taken into consideration or can be directly determined by a small-scale experiment. It may also be necessary to take into consideration the fact that the absorption maximum of the compound to be incorporated is affected by the substituents in the aromatic residue.

Example 1

An acetylcellulose film about 50μ thick is prepared by pouring out a 10% acetonic acetylcellulose solution containing 1% (of the weight of acetylcellulose) of the compound of the Formula 19. After drying the film, it reveals the following percentual light transmission values.

| | Light transmission in percent | |
|---|---|---|
| Wavelength in mm. | Unexposed | Exposed for 100 hours in a fade-ometer |
| 270 to 300 | 0 | 0 |
| 310 | 3 | 3 |
| 320 | 5 | 5 |
| 330 | 12 | 12 |
| 340 | 30 | 30 |
| 350 | 50 | 50 |

| I | II | III | IV Calculated C H N | IV Found C H N |
|---|---|---|---|---|
| | $B_1$ | | | |
| (54) | $CH_3O-\langle\phantom{X}\rangle-NH-\overset{O}{\overset{\|}{C}}-COO-R_3'$ | | | |
| 55 | $R'=-CH_3$ | 138.5–139.5 | 57.41  5.30  6.70 | 57.54  5.29  6.79 |
| 56 | $-C_3H_7$ | 73.5–74.5 | 60.75  6.37  5.90 | 60.76  6.23  5.94 |
| 57 | $-C_4H_9$ | 75–76 | 62.14  6.82  5.57 | 62.15  6.94  5.63 |
| 58 | $-C_8H_{17}$ | 61–62 | 66.42  8.20  4.56 | 66.65  8.13  4.33 |
| 59 | $-C_{18}H_{37}$ | 95.5–96.5 | 72.44  10.13  3.13 | 72.27  10.16  3.00 |
| 16 | $-CH_2\underset{\|}{\overset{\|}{CH}}$ with $C_4H_9$ and $C_2H_5$ | 66.5–68 | 66.42  8.20  4.56 | 66.76  8.08  4.47 |
| 60 | $-CH_2-\langle\phantom{X}\rangle$ | 104.4–105 | 67.36  5.30  4.91 | 67.64  5.50  4.81 |
| 61 | $R=-CH_2CH_2OCH_3$ | 86.5–87.5 | 56.91  5.97  5.53 | 56.96  5.95  5.74 |
| 62 | $-\langle H \rangle$ | 120–120.5 | 64.96  6.91  5.05 | 65.28  6.81  5.28 |
| | $B_2$ | | | |
| 11 | $C_8H_{17}O-\langle\phantom{X}\rangle-NHCOCOOCH_3$ | 95–95.5 | 66.42  8.20  4.56 | 66.54  8.34  4.76 |
| 63 | $C_8H_{17}O-\langle\phantom{X}\rangle-NHCOCOO-C_8H_{17}$ | 63–64 | 71.7  9.69  3.45 | 71.17  9.73  3.68 |
| 64 | $C_8H_{17}O-\langle\phantom{X}\rangle-NHCOCOO-C_4H_9$ | 55.5–56.5 | 68.74  8.94  4.01 | 69.06  8.88  4.30 |
| 65 | $\underset{OCH_3}{\langle\phantom{X}\rangle}-NH-CO-COOCH_2CH_2-\underset{CH_3}{O}$ with $CH_3$ | 83–84 | 58.42  6.41  5.24 | 58.53  6.30  5.22 |

EXAMPLES

In the following examples parts and percentages are likewise by weight, unless otherwise indicated. In each of these examples typical representatives of the individual subgroup of compounds according to this invention were used. In principle, all compounds mentioned in the foregoing description and their equivalents are equally suitable, except that the solubility of the individual com- Similar results are obtained, for example, with the compound of the Formula 9, 24, 30 or 44.

Example 2

A paste from 100 parts of polyvinylchloride, 59 parts by volume of dioctylphthalate and 0.5 part of the compound of the Formula 9 is rolled to and fro on a calender at 145 to 150° C. to form a foil about 0.5 mm. thick. The polyvinyl-chloride foil obtained in this manner absorbs in the ultraviolet region from 280 to 340 mµ.

Instead of the compound of the Formula 9, it is possible to use, for example the compound of the Formula 19, 24, 40, 47, 52 or 58.

Example 3

A mixture of 100 parts of polyethylene and 0.2 part of the compound of the formula 9 is rolled on a calendar at 130 to 140° C. to form a foil which is then compressed at 150° C.

The polyethylene foil obtained in this manner is substantially impermeable to ultraviolet light in the region from 280 to 350 mµ.

The compound of the Formula 9 may be replaced, for example, by the compounds of the Formulas 19, 24, 40, 47, 49 or 52.

Example 4

A mixture of 100 parts of polypropylene with 0.5 part of one of the Compounds 9, 19, 24, 30, 43 or 51 is turned into a sheet on a calendar at 170° C. The sheet is then compressed at 230 to 240° C. under a maximum pressure of 40 kg./cm.$^2$ to form a panel 1 mm. thick.

The panels obtained in this manner are substantially impermeable to ultraviolet light in the region from 280 to 350 mµ.

Example 5

A solution of 0.5 part of the compound of the Formula 9 in 1.8 parts of monostyrene is mixed with 0.5 part of a solution of cobalt naphthenate in monostyrene (containing 1% of cobalt). Then 40 parts of an unsaturated polyester based on phthalic acid-maleic acid-ethyleneglycol in monostyrene are added and the whole is stirred for 10 minutes. 1.7 parts of a catalyst solution (methylethylketone peroxide in dimethylphthalate) are dropped in and the well stirred, air-free mixture is poured in between two panes of glass. After about 20 minutes the polyester panel of about 1 mm. thickness has sufficiently solidified to be taken out of the mould; it is substantially impermeable to ultraviolet light in the region from 280 to 350 mµ.

The compound of the Formula 9 may be replaced, for example, by the compound of the Formula 20, 27, 28, 40, 46 or 59.

Example 6

25 grams of distilled monostyrene are prepolymerized in a stoppered flask in a heating cabinet for 2 days at 90° C., and then 0.5 g. of the compound of the Formula 9, 19, 24, 30, 37, 52 or 65 and 0.05 g. of benzoyl peroxide are slowly stirred into the viscous mass. The mixture is then poured into a cubic mould from aluminum foil and heated for 1 day at 70° C. When the batch has completely solidified and cooled off, the mould is broken apart. The cube obtained in this manner is then pressed in a hydraulic press at a temperature of 138° C. under a pressure of 150 kg./cm.$^2$ to form a panel 1 mm. thick.

The polystyrene panels prepared in this manner are substantially impermeable to ultraviolet light in the region from 280 to 350mµ. They are completely colourless. On exposure in a fadeometer a distinct improvement in the light stability is observed, since polystyrene panels containing a compound of the above-mentioned formulae do not display any sign of yellowing after 200 hours' exposure, whereas panels not containing these compounds have turned yellow after this time.

Other compounds listed in the table behave in a similar manner.

Example 7

0.2 gram of the compound of the Formula 9, 24, 30, 47, 51 or 55 is dissolved in 40 g. of clear nitro-cellulose lacquer (of 25% solids content). The lacquer is then evenly applied to maplewood panels with the use of a doctor brush, and after a short time it is completely dry.

The addition of the afore-mentioned ultraviolet absorbers to the lacquer does not alter the shade of the wood. The light shade of the lacquered wood does not change even after several days under an ultraviolet lamp, provided the lacquer contains the above-mentioned compounds in a concentration of about 1%. Untreated wood darkens after only a few days under the exposure conditions described above.

Similar results are obtained by using acrylic resin- or alkyl-melamine resin lacquers and other compounds listed in the table.

Example 8

8 grams of a 65:35-mixture of toluylene-2,4-diisocyanate and toluylene-2,6-diisocyanate are stirred for about 15 seconds with 20 g. of a little-branched polyester from adipic acid, diethyleneglycol and triol (hydroxyl number 60). Then there are added 2 ml. of a catalyst mixture (consisting of 6 ml. of a tertiary amine, 3 ml. of a dispersant, 3 ml. of a stabilizer and 2 ml. of water) and also 0.56 g. of a compound of the Formula 9, 19, 24, 40, 45 or 49 and the whole is stirred for a short time. A foamed fleece forms which after 30 minutes is placed in a water bath. After another 30 minutes it is thoroughly washed with water and dried at room temperature.

The addition of one of the above-mentioned ultraviolet absorbers increases the stability of the product on being exposed in the xeno test apparatus. The above-mentioned absorbers also lend themselves very well to incorporation in numerous other polyurethanes obtained by the isocyanate poly-addition process.

Other compounds listed in the table behave in a similar manner.

Example 9

0.2 gram of the compound of the Formula 19, 22, 26, to 30, 31, 37 or 49 is dissolved in 10 g. of pure olive oil. The compounds dissolve very rapidly without heating. A 50µ thick layer of this solution absorbs ultraviolet light up to 340 mµ.

Other fatty oils and creams, or emulsions, used for cosmetic purposes, may likewise be used for dissolving the above-mentioned products or other products of this invention.

Example 10

To manufacture an emulsion suitable as a cosmetic sunburn preparation the oily phase A and the aqueous phase B of the following compositions are required:

(A)

| | Parts |
|---|---|
| Colloid-disperse mixture from 90% of cetyl alcohol and stearyl alcohol and 10% of sodium laurylsulphate | 8.0 |
| Distearate of polyethyleneglycol of molecular weight 400 | 5.0 |
| Diethyleneglycol monostearate | 3.0 |
| Isopropyl myristate | 5.0 |
| Paraffin oil | 5.0 |
| Polyethyleneglycol of molecular weight 300 | 20.0 |
| Compound of the Formula 19, 27, 29, 37, or 49 | 1.5 |

(B)

| | |
|---|---|
| Para-hydroxybenzoic acid methyl ester | 0.3 |
| Distilled water | 51.9 |

The melted oil phase A, heated to 70° C. is added to the vigorously stirred aqueous phase B which is heated to 75° C. The emulsion is stirred until cold and perfumed (0.3 part of perfume).

Example 11

A solution of the following composition is prepared in the usual manner:

| | Parts |
|---|---|
| Compound of the Formula 19, 22, 26, 27, 28, 30, or 31 | 3 |
| Polyethyleneglycol of mol weight 300 | 40 |
| Propyleneglycol | 25 |
| Isopropyl myristate | 2.5 |
| Ethanol | 29.2 |
| Perfume | 0.3 |

The resulting solution may be used to protect human skin from ultraviolet rays; it is advantageously applied to the skin in aerosol form.

What is claimed is:

1. A composition of matter consisting essentially of a polymer selected from the group consisting of a poly-α-olefine, an unsaturated polyester and polyvinylchloride, and as an ultraviolet light stabilizer, an oxalic acid ester amide incorporated therein in an amount of from 0.01 to 10%, by weight, calculated on said polymer, and said oxalic acid ester amide being of the formula

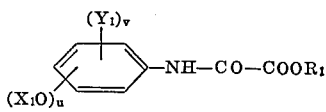

in which Formula $X_1$ represents a member selected from the group consisting of an alkyl group containing 1 to 18 carbon atoms, an alkenyl group and an aralkyl group; $Y_1$ represents a member selected from the group consisting of an alkyl group with 1 to 12 carbon atoms, a halogen atom, a halogenalkyl group, a phenyl group and a phenylalkyl group whose alkyl residue contains 1 to 4 carbon atoms, two ortho-positioned residues $Y_1$ together forming a fused-on six-membered aromatic carbon ring, and $R_1$ stands for a member selected from the group consisting of an alkyl group containing 1 to 18 carbon atoms, the benzyl group and a phenyl group, and $u$ and $v=0$, 1 or 2, the sum $(u+v)$ being 1 or 2 and the value 0 indicating a hydrogen atom when used as an index number.

2. A composition of matter as claimed in claim 1, said oxalic acid ester amide being of the formula

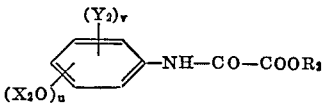

in which $X_3'$ represents an alkyl group with 1 to 4 carbon atoms and $R_4$ the methyl or ethyl group.

3. A composition of matter consisting essentially of a polymer selected from the group consisting of a poly-α-olefine, an unsaturated polyester and polyvinylchloride and as an ultraviolet light stabilizer, an oxalic acid ester amide incorporated therein in an amount of from 0.01 to 10% by weight, calculated on said polymer, said oxalic acid ester amide being of the formula

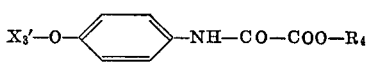

in which $X_2$ represents a member selected from the group consisting of an alkyl group containing 1 to 18 carbon atoms which may be substituted by Cl, HO, alkoxy groups with 1 to 4 carbon atoms, carboxyl groups, carboxylic acid alkyl ester groups, or carboxylic acid amide groups containing 1 to 12 carbon atoms, an alkenyl group containing 3 to 4 carbon atoms and a benzyl group which may be substituted by Cl or methyl groups; $Y_2$ represents a member selected from the group consisting of a hydrogen atom, an alkyl group containing 1 to 12 carbon atoms, a halogen atom, a halogenomethyl group, a phenyl group and a phenylalkyl group; $R_2$ represents an alkyl group containing 1 to 8 carbon atoms and $u$ and $v=0$, 1 or 2 with the sum $(u+v)=1$ or 2.

4. A composition of matter as claimed in claim 1, said oxalic acid ester amide being of the formula

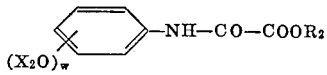

in which $X_2$ represents a member selected from the group consisting of an alkyl group containing 1 to 18 carbon atoms which may be substituted by Cl, HO, alkoxy groups with 1 to 4 carbon atoms, carboxyl, carboxylic acid alkyl ester or carboxylic acid amide groups with 1 to 12 carbon atoms, an alkenyl group containing 3 to 4 carbon atoms, and a benzyl group which may be substituted by Cl or methyl groups; $R_2$ represents an alkyl group with 1 to 8 carbon atoms, and $w=1$ or 2.

5. A composition of matter consisting essentially of a polymer selected from the group consisting of a poly-α-olefine, an unsaturated polyester and polyvinylchloride and as an ultraviolet light stabilizer, an oxalic acid ester amide incorporated therein in an amount of from 0.01 to 10% by weight, calculated on said polymer, said oxalic acid ester amide being of the formula

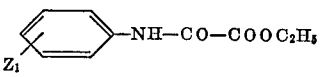

in which $Z_1$ represents a member selected from the group consisting of an alkyl group with 1 to 6 carbon atoms, an alkoxy group with 1 to 8 carbon atoms, an alkylamino group whose alkyl residue may contain 1 to 4 carbon atoms, a chlorine or bromine atom, a trifluoromethyl group and a nitro group.

6. A composition of matter consisting essentially of a polymer selected from the group consisting of a poly-α-olefine, an unsaturated polyester and polyvinylchloride and as an ultraviolet light stabilizer, an oxalic acid ester amide incorporated therein in an amount of from 0.01 to 10% by weight, calculated on said polymer, said oxalic acid ester amide being of the formula

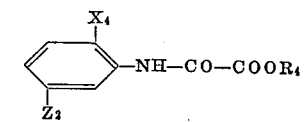

in which $X_4$ represents an alkoxy group with 1 to 4 carbon atoms, $Z_2$ an alkoxy or alkyl group with 1 to 4 carbon atoms or a halogen atom, and $R_4$ the methyl or ethyl group.

7. A composition of matter comprising substantially of polyvinyl chloride and an oxalic acid ester amide incorporated therein in an amount of from 0.01 to 10% by weight calculated on said polyvinyl chloride, and said oxalic acid ester amide is of the formula

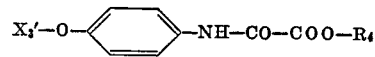

in which $X_3'$ represents an alkyl group with 1 to 4 carbon atoms and $R_4$ the methyl or ethyl group.

References Cited

UNITED STATES PATENTS 3,318,842  5/1967  Blachere et al. _____ 260—45.85

OTHER REFERENCES

Crystalline Olefin Polymers, Part II, by Raff et al., Interscience Publishers, 1965, pp. 363–366.

DONALD E. CZAJA, Primary Examiner

V. P. HOKE, Assistant Examiner

U.S. Cl. X.R.

106—178, 179; 252—89, 522; 260—2.5, 810, 814; 424—60, 365

PO-1050
(5/69)

UNITED STATES PATENT OFFICE
CERTIFICATE OF CORRECTION

Patent No. 3,511,804　　　　　　　　Dated May 12, 1970

Inventor(s) MAX DUENNENBERGER ET AL

It is certified that error appears in the above-identified patent and that said Letters Patent are hereby corrected as shown below:

Column 18, line 1, change "claim 1" to read --- claim 3 ---.

Signed and sealed this 6th day of April 1971.

(SEAL)
Attest:

EDWARD M. FLETCHER, JR.
Attesting Officer

WILLIAM E. SCHUYLER, JR.
Commissioner of Patents